Nov. 17, 1953  B. N. WALLIS  2,659,553
MEANS FOR LAUNCHING AIRPLANES AND OTHER FLYING BODIES
Filed Dec. 12, 1950  4 Sheets-Sheet 1

INVENTOR
Barnes Neville Wallis
By Moses, Nolte, Crews & Berry
Attorneys

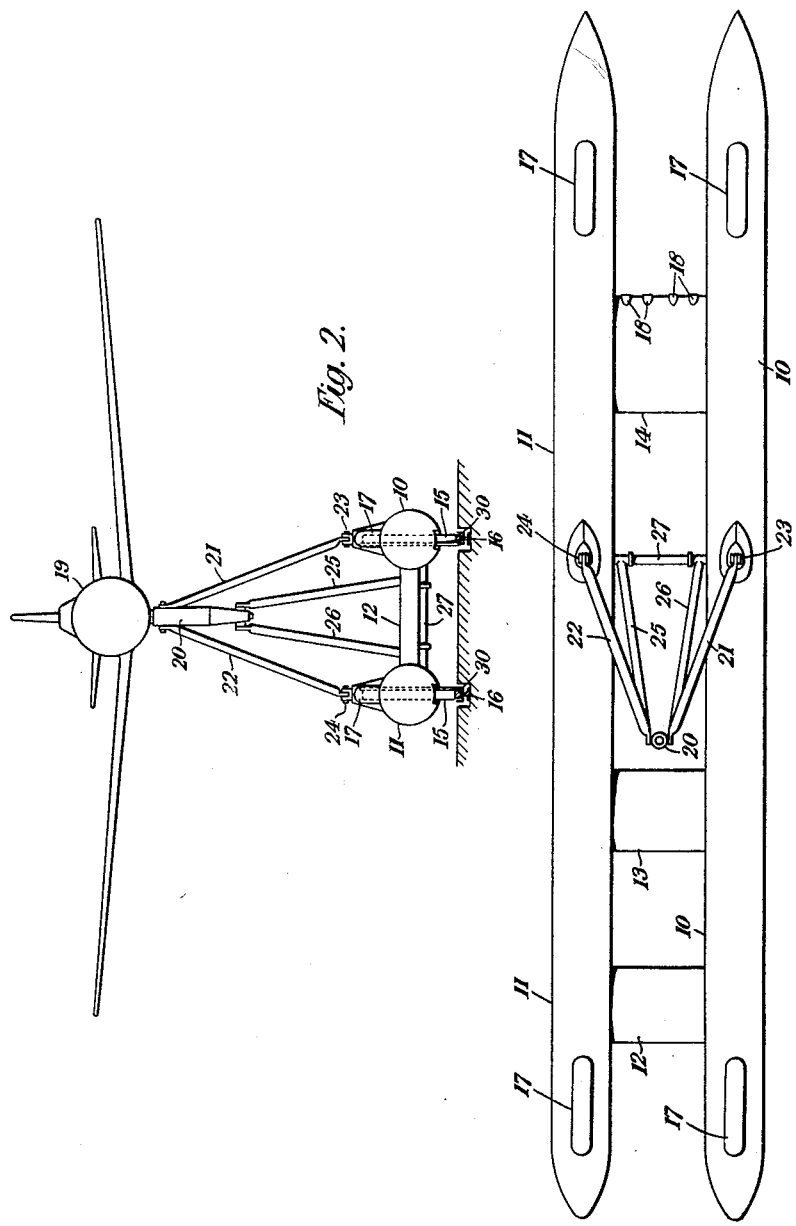

Patented Nov. 17, 1953

2,659,553

UNITED STATES PATENT OFFICE 2,659,553

MEANS FOR LAUNCHING AIRPLANES AND OTHER FLYING BODIES

Barnes Neville Wallis, Weybridge, England, assignor to Vickers-Armstrongs Limited, London, England, a British company Application December 12, 1950, Serial No. 200,327

5 Claims. (Cl. 244—63)

1

This invention is concerned with the launching of aeroplanes, remotely-controlled projectiles and other flying bodies, particularly (though not exclusively) such aeroplanes and the like as are propelled by jet-thrust means.

Modern developments in aeronautical design have produced such improvements in body and wing shapes that of all the drag forces which are encountered by an aeroplane in flight those which are of the most importance in the higher speed ranges, viz. frictional resistance and compressibility drag, have been reduced to the point at which their sum is less than those which have their greatest effect at take-off and low flying speeds, viz. inertia, ground friction and induced drag. This process of development is found to affect profoundly the question of the power installation of an aircraft since it will be understood that the thrust which must be provided to propel the aeroplane at high speeds is no longer sufficient to overcome take-off and low speed drag forces.

Economy requires that the size and weight of the power plant shall be determined, as far as possible, by high speed drag, an aim which can be achieved by the provision of some form of auxiliary power plant the sole function of which is to assist take-off. Three alternative methods of providing assisted take-off are known; i. e.

(a) Auxiliary apparatus carried in or by the aircraft;
(b) Catapult apparatus;
(c) The self-propelled launching carriage or trolley.

Of these alternative methods, the first adds substantially to the take-off weight and may encroach considerably upon valuable space in the aircraft, apart from the structural and mechanical complications which it entails. The second method requires a horizontal acceleration of the launched aircraft exceeding in degree that which can be tolerated by civilian passenger traffic. The third has never been developed beyond a crude experimental stage, probably because the need for it has not hitherto seriously arisen.

The present invention is directed to the provision of a form of launching system, utilising the self-propelled carriage or trolley, and the means whereby it may be carried into effect, whereby it will be rendered possible to derive the maximum advantage from the reduction in high speed drag rendered possible by modern developments in the design of body and wing shapes and to achieve certain other advantages as hereinafter described.

2

According to this invention, an aeroplane is launched from a travelling carriage which is propelled by jet-thrust or other apparatus. Means are provided whereby the aeroplane is mounted upon the carriage with freedom to assume its flying attitude and held on its mounting until the carriage has gained sufficient speed to enable the aeroplane wings to develop a lifting force exceeding the weight of the aeroplane by a predetermined margin, said means being automatically unlocked when said excess lift has been maintained continuously for a predetermined period.

A further feature of the invention consists in the provision of means whereby the aeroplane may be supported upon the launching carriage so that its longitudinal axis lies in the relative wind.

In this way it is found feasible to perform each launching operation safely, without the use of assisted take-off apparatus in the aeroplane, and with the certainty that when the aeroplane is released from the launching carriage, the excess lift causes a vertical acceleration which will carry it clear of the carriage and enable it to climb to a height at which it can proceed in flight under its own power without risk of stalling or, should its propulsive apparatus be in any way defective, provide an opportunity for a landing within the limits of the aerodrome. The arrangement by which the moment of release is delayed for a predetermined period ensures that the automatic unlocking means will not be affected by transient gusts.

A preferred embodiment of the invention is illustrated in and hereinafter described with reference to the accompanying drawings, in which Fig. 1 is a longitudinal elevation of a launching carriage, with an aeroplane mounted thereon in the take-off position and Fig. 2 is a front elevation thereof. Fig. 3 is a plan of the carriage alone.

Figure 1:
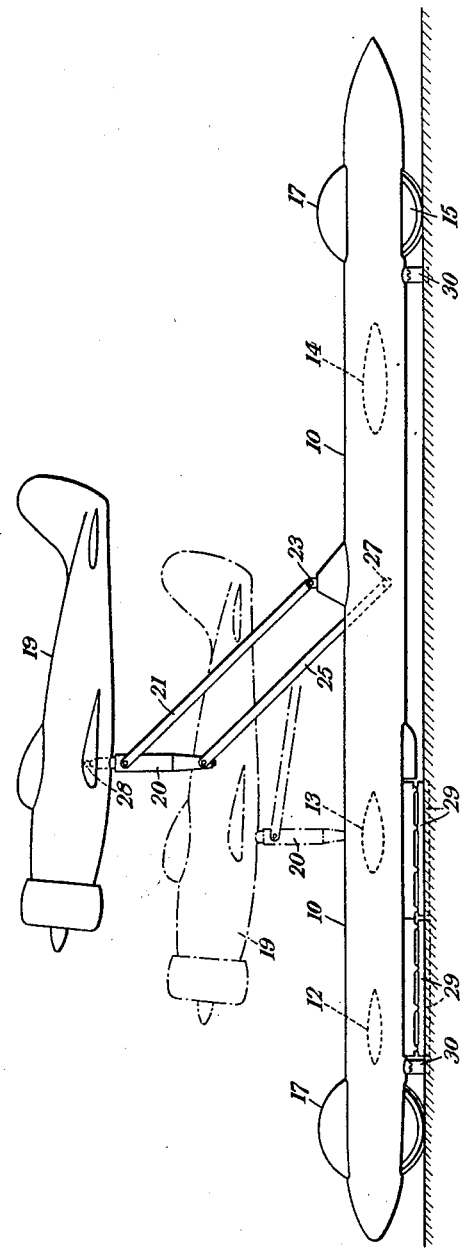

The launching carriage shown in the drawings consists of a wheeled trolley which is mounted on a straight railed track extending across the aerodrome, the aeroplane being supported on the trolley with freedom to assume the flying attitude. The trolley comprises two longitudinal tubular booms 10 and 11 which are connected by spaced transverse members 12, 13 and 14. Each such boom is provided near each end with suitable bearings for the axle of a flanged carrying wheel 15, by which the trolley is enabled to run upon the track rails 16, 16 as shown in Fig. 2. Fairings for the wheels 15 are indicated at 17, 17.

The rear transverse member 14 incorporates a housing for jet-propulsion apparatus of which four jet-tubes are indicated at 18, 18, etc.; means may be provided whereby the supply of fuel to the jet-apparatus is automatically cut off and braking-gear automatically brought into operation when the aeroplane takes off, e. g. by the operation of trip-mechanism which is actuated when the locking means hereinafter referred to are released. In addition, the jet cut-off and braking gear will be applied automatically when the trolley has run a predetermined distance and is approaching the distant end of its track.

The aeroplane, which is indicated in Figs. 1 and 2 by the reference numeral 19, is supported upon a frame comprising a pillar 20 which is carried upon a duplex parallel linkage pivotally mounted on the trolley so that said pillar 20 may be moved between the take-off position, indicated in Fig. 1 by the full lines, and the servicing position indicated in chain-dotted lines, and vice versa, without disturbing the attitude of the aeroplane. Said linkage consists of two tubular bars 21 and 22, which are pivoted at their respective ends to the upper end of the pillar 20 and to bearing points 23 and 24 on the upper side of the booms 10 and 11, and two further bars 25 and 26, which are pivoted at their respective ends to the lower end of the pillar 20 and to a cross-member 27.

The point of support of the aeroplane on the pillar 20 is indicated at 28, the fuselage being provided with a built-in socket (not shown) in which the apex of the pillar 20 is received. To ensure that the aeroplane is not rotated out of the correct take-off attitude at the moment of release, by a positive pitching moment due to aerodynamic drag or the inertia of the aeroplane when the carriage is driven forward, the constructional arrangement of the aeroplane mounting is such that the said point of support is located as nearly as possible at the same height as the centre of gravity of the aeroplane, through which will pass the resultant horizontal force due to drag. Thus couples due to external horizontal forces acting upon the aeroplane are rendered negligible in comparison with the large pitching moments which are caused by vertical forces acting on the body and wings.

Due to the fact that the support of the aeroplane is concentrated at a single point, the aeroplane is free to rotate about a vertical axis passing through or near its centre of gravity, so that in the event of a take-off in a cross-wind the aeroplane automatically assumes a position in which the vertical plane containing its longitudinal axis lies in the relative wind.

Figures 4, 8:
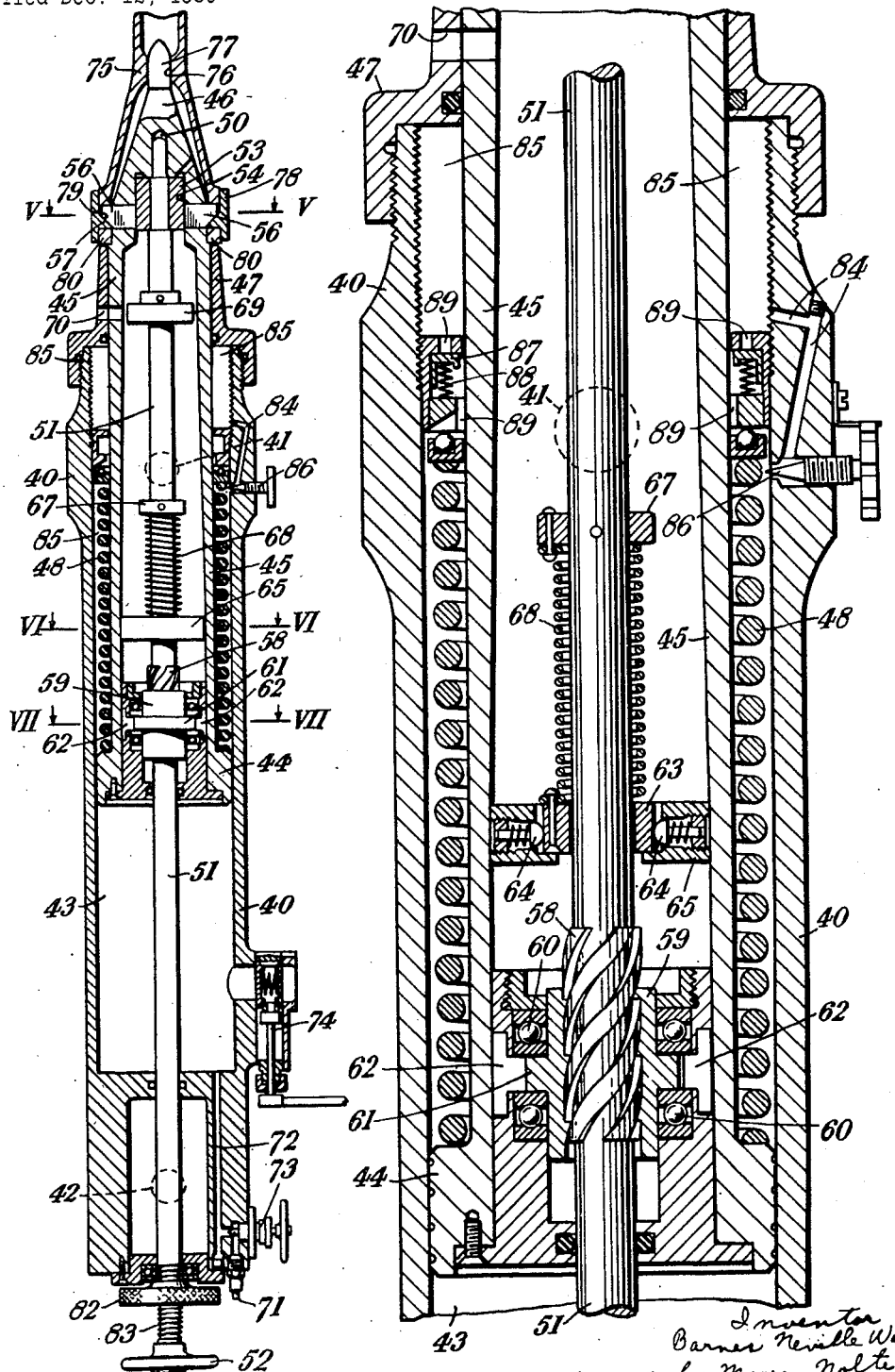
Figure 4 is a view in vertical sectional elevation of a pillar which forms part of the temporary aeroplane anchorage.
Figure 8 is a fragmentary sectional detailed view similar to Figure 4 and on a larger scale than Figure 4, showing only a portion of the structure shown by Figure 4.

A suitable form of releasable attachment, by which the aeroplane is locked upon the carriage during the launching run until conditions are appropriate for take-off, is illustrated in Figures 4 to 8 of the drawings, such attachment being incorporated in the structure of the aforesaid vertical pillar 20. In Figure 4 the body of said pillar is indicated at 40, and the points at which it is connected to the parallel links 21, 25 of the supporting frame are marked by the numerals 41 and 42.

The pillar body 40 encloses for the greater part of its length a cylinder 43 which houses a piston 44 having an upward tubular extension 45 which protrudes beyond the top of the cylinder where it is formed integrally with a spigot 46 the longitudinal axis of which coincides with that of the cylinder 43. The upper end of the cylinder is provided with a sleeve-like cap 47 fitting closely against the piston extension 45. A helical spring 48 (hereinafter called the "main spring") is fitted about the extension 45 and is adapted to be compressed between the upper face of the piston 44 and an annular nut 49 which screws into the upper part of the bore of the cylinder 43. The nut 49 is adjusted until the axial force exerted by the compressed spring 48 is equal to the weight of the aeroplane to be launched.

Passing co-axially through the pillar 40 and the piston 44, and extending into a co-axial cavity 50 bored in the underside of the spigot 46, is a shaft 51 bearing at its lowest extremity a hand-wheel 52 and pinned at a point near its upper extremity to a cam 53 which is arranged to rotate in a counter-bored cavity 54 in the spigot 46. Said cam 53 is of the peculiar shape illustrated in Figure 5, having two diametrically opposed lobes 55 fashioned with part-cylindrical faces which make rotary sliding contact with the cylindrical bore of the spigot cavity 54. Opposite said cam the spigot 46 is slotted diametrically to house on either side of the cam a pair of slidable latches 56 which are chamfered on the undersides of their outer ends, as shown at 57, for the purpose hereinafter explained.

Figure 7:
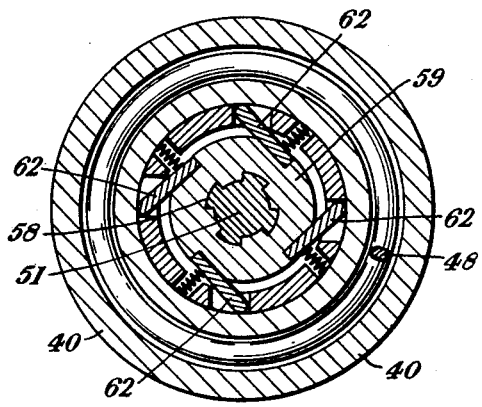

The shaft 51, termed the "cam-shaft," is provided with a multiple quick thread 58 which mates with a correspondingly threaded nut 59 rotatably mounted in the piston 44 between two thrust-bearings 60, 60. The nut 59 includes a ratchet 61 the notches of which are engaged by four spring-loaded pawls 62 carried by the piston in such fashion as to permit rotary motion of the nut in relation to the piston only in a clockwise direction as seen in Figure 7.

The spigot assembly, comprising the spigot 46, the piston 44 and the piston extension 45, collectively constitutes the "bolt" of the attachment, the operative connection between said bolt and the latches 56 being provided by the cam-shaft 51 and the mechanism associated therewith.

Figure 6:
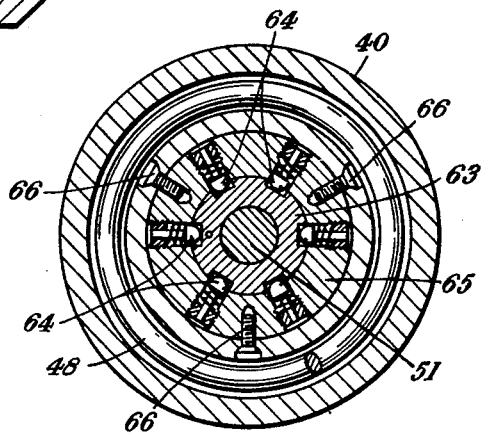

Above the piston the cam-shaft 51 is coupled to the piston extension 45 by a clutch comprising an element 63 mounted on the shaft and the peripheral surface of which is corrugated axially to cooperate with a plurality of radially spaced spring-pressed shoes 64 which are adjustably housed in an annulus 65 which is itself attached to the interior of the extension 45 by screws 66 (Fig. 6). Compressed between the upper face of the element 63 and a collar 67 pinned to the cam-shaft 51 is a light spring 68.

Near to its upper end the cam-shaft 51 carries a fixed collar 69, called the "register collar," on the rim of which are engraved a horizontal index mark and a vertical index mark which can be viewed through an inspection hole 70 drilled through the side of the cap 47 and the wall of the extension 45.

At the base of the pillar is provided a compressed air supply connection 71, which communicates with the interior of the cylinder 43 beneath the piston 44 by a duct 72 controlled by a valve 73. An exhaust valve is provided at 74.

Figure 5:
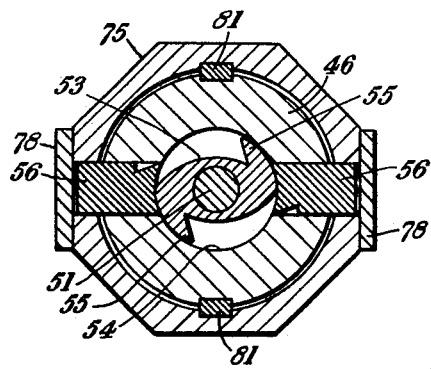
Figures 5, 6 and 7 are transverse sectional views taken respectively upon the lines V—V, VI—VI and VII—VII of Figure 4, looking in the direction of the arrows.

The aeroplane is provided as a part of its structure with an inverted conical socket 75, the upper part of which is drilled at 76 to receive the cylindrical extremity 77 of the spigot 46, and which bears on its lower rim an annulus 78 furnished internally with a chamfered face 79 and terminating in a seating nut 80. (The annulus 78 constitutes the detent on the attached object, i. e. the aeroplane, which is engaged by the latches 56.) The socket 75 is arranged to be located with respect to the longitudinal axis of the pillar when lowered upon the spigot 46 by a pair of keys 81 which are received in keyways provided in the contacting faces of the socket and the spigot (Fig. 5). A nut 82 is mounted on a threaded part 83 of the cam-shaft 51 between the hand-wheel 52 and the base of the pillar.

Preparatory to lowering the aeroplane on to the launching carriage, the exhaust valve 74 is closed, a source of compressed air is attached to the connection 71 and the valve 73 opened, so that the air entering the cylinder 43 forces the piston 44 upwards. The piston is allowed to rise, taking with it the cam-shaft 51, until the horizontal index mark on the rim of the register collar 69 arrives opposite the centre of the inspection hole 70. The compression of the spring 68 ensures that the upper end-face of the cam 53 is in contact with the upper end of the bore 54 in the spigot 46 and therefore that the thread 58 on the cam-shaft is in correct registration with the nut 59. Visual inspection will show that the latches 56 are retracted to their inmost position, in which they are held by their engagement by the claw-like edges of the lobes 55 of the cam 53.

The aeroplane is lowered so that the socket 75 passes over the spigot 46, the part 77 of the latter entering the bore 76 and the keys 81 guiding the socket into its correct position in relation to the axis of the pillar, until the seating nut 80 rests upon the upper rim of the cap 47, as shown in Figure 4.

The cam-shaft 51 is then rotated by the hand-wheel 52 through approximately 90° in a clockwise direction looking downwards. This action causes the lobes 55 of the cam 53 to push the latches 56 outwardly until their chamfered faces 57 make contact with the similar faces 79 on the annulus 78, which is fixed to the aeroplane socket 75. Verification that the latches are fully engaged is made by ascertaining that the vertical index mark on the rim of the register collar 69 is seen at the centre of the inspection hole 70. The valve 73 is now closed, the air supply disconnected from the inlet 73, and the valve 74 is opened, discharging the air in the cylinder 43 to exhaust.

Preparatory to take-off, the nut 82 is screwed up until it abuts against the base of the pillar body 40, as in Figure 4, leaving the cam-shaft 51 free to rotate but preventing it from rising when the spigot 46 and piston 44 are raised. As the launching carriage gains speed the lifting force developed by the wings is transmitted through the socket 75 and the latches 56 to the spigot 46 and piston 44, tending to force the latches 56 inwardly. When the carriage speed has increased to the point at which the lifting force exceeds the weight of the aircraft, the spring 48 commences to compress, so that the spigot 46 and piston 44 together with the quick-thread nut 59 rise, the axial movement of the latter causing the cam-shaft 51 to rotate, rotation of the nut in the opposite direction being prevented by the ratchet and pawl mechanism 61, 62. When the excess lift attains the predetermined margin over the weight of the aeroplane, the spring 48 will have been compressed sufficiently to produce a 90° rotation of the cam 53, so that the latches 56 are free to travel inwardly under the pressure of the chamfered surface 79 on the socket annulus 78 and, the socket 75 being now disconnected from the spigot 46, the aeroplane will take off in free flight.

The delay in operation necessary to preclude the release mechanism from being operated by a transient gust, or by a momentary localization of the weight of the aeroplane due to an upward bumping on the carriage is ensured by the retardation of the passage of the oil which is trapped in the lower part of the annular chamber 85 within the upper part of the pillar 40, through the obturated by-pass 84. An obturator valve 86 is provided for regulating the rate of flow of the oil through said by-pass 84, and to permit an accelerated return, a one-way valve 87 governed by springs 88 is arranged to open to permit additional flow of oil back into the lower part of the chamber 85 through the passages 89.

As the aeroplane rises away from the carriage, the spring 48 retracts the piston 44 so that the spigot 46 is quickly withdrawn into the pillar, ensuring that it cannot come into contact with any part of the aeroplane before the latter has gained height. The piston 44 descends until it covers the outlet of the exhaust valve 74, when it will be arrested by the cushioning effect of the trapped air which is compressed in the base of the cylinder 43.

The latches 56 are again retained in the retracted position by the claw-like lobes 55 of the cam 53, which latter is held in place by the torsion of the spring 68. The clutch 63, 64 limits the torque so transmitted to the cam-shaft to a safe value and ensures that said spring 68 is not overloaded.

During the descent of the piston 44, the quick thread 58 on the cam-shaft 51 rotates the nut 59 in a clockwise direction (viewed downwards) and the cam-shaft 51 rises under the influence of the spring 68 to its initial position, such movement of the cam-shaft being damped by the compression of air trapped in the spigot cavity 50.

The aeroplane may be removed from the carriage when the latter is at rest, the nut 82 occupying the position shown in Figure 4, by closing the exhaust valve 74, and applying compressed air to the cylinder 43 until the spigot assembly has risen through approximately one inch. The cam-shaft 51 will thus be rotated to release the latches 56 and the aeroplane can be lifted freely and removed.

The brakes may comprise shoes 29 arranged to be pressed against the sides of the rails 16, and if desired I may provide clips 30 which embrace the heads of the rails and are capable of sliding along the same as the carriage travels forward, providing positive means for preventing the carriage from leaving the track.

Other advantages derived from the improved launching system are that it enables the weight and space required for an assisted take-off unit to be eliminated from the aircraft, with a corresponding reduction in the weight of, and fuel tankage required for, a power plant limited to that required for flight at high speeds, and that the short length of runway required and the possibility of using a single runway for take-off in all weather conditions together render it possible to use separate runways for landing and thereby double the traffic capacity of existing conventional aerodromes.

If desired, a launching carriage such as that herein described may be utilised for observing and measuring the aerodynamic characteristics of an aeroplane in conditions more closely approximating to those experienced in actual flight than is possible in the conventional wind-tunnel, and without the disadvantages, e. g. turbulence of the airstream, and the like, which are characteristic thereof. For this purpose it is merely necessary to provide, in conjunction with the releasable anchorage by which the aeroplane is connected to the trolley, means effective to prevent the operation of the release mechanism when the carriage speed attains the critical value at which the excess lifting forces developed on the wings would otherwise be sufficient to initiate the actual launching operation. Examples of such release-preventing means are described in United States patent application Serial No. 200,328, filed December 12, 1950. It will be understood that the only restraint exercised upon the aeroplane when the launching carriage is used in this manner is that which prevents its vertical movement for take-off; as previously stated, the manner in which it is mounted on the carriage affords the aeroplane freedom to assume the flying attitude by movement about its OY and OX axes (i. e. respectively in pitch and roll) and to turn about its OZ axis to align itself in the relative wind whatever may be the direction of the latter. It thus becomes possible, by the use of dynamometers and/or other suitable instruments, to measure the response of the aeroplane to selected degrees of deflection of the control organs at different speeds, within the capacity of the landing carriage.

What I claim as my invention and desire to secure by Letters Patent is:

1. Aeroplane-launching apparatus, comprising a carriage adapted to be propelled along the take-off runway, a mounting on said carriage for supporting an aeroplane with freedom to assume an attitude of flight, latching means securing the aeroplane on said mounting until after the lifting force developed on the aeroplane wings by the airstream due to the movement of the carriage exceeds the take-off weight of the aeroplane by a predetermined margin but operable thereafter automatically to effect release of the aeroplane, and means acting on the latching means to delay such automatic release until said excess lift has been maintained continuously for substantially a predetermined period.

2. Aeroplane launching apparatus, comprising a carriage adapted to be propelled along the take-off runway, a mounting on said carriage for supporting an aeroplane, means connecting the mounting to the aeroplane, said connecting means being flexibly connected to the aeroplane substantially at the center of mass of the aeroplane, so that the aeroplane may assume an attitude of flight while connected to said mounting means, latching means securing the connecting means to said mounting means until after the lifting force developed on the aeroplane wings by the air stream due to the movement of the carriage exceeds the take-off weight of the aeroplane by a predetermined margin, but operable thereafter automatically to effect release of the aeroplane, and means acting on the latching means to delay such automatic release until said excess lift has been maintained continuously for substantially a predetermined period.

3. Aeroplane-launching apparatus, comprising a carriage adapted to be propelled along the take-off runway, a mounting on said carriage for supporting an aeroplane with freedom to assume an attitude of flight, latching means securing the aeroplane on said mounting until after the lifting force developed on the aeroplane wings by the air stream due to the movement of the carriage exceeds the take-off weight of the aeroplane by a predetermined margin, but operable thereafter automatically to effect release of the aeroplane, and means acting on the latching means to delay such automatic release until said excess lift has been maintained continuously for substantially a predetermined period, a mounting at or near each corner of the carriage for a flanged wheel, flanged wheels on the respective mountings, a vertical pillar providing at its apex the mounting for the aeroplane, and a parallel linkage supporting the pillar from the booms whereby said pillar may be raised and lowered between the servicing position and the take-off position without disturbing the attitude of the aeroplane.

4. Aeroplane-launching apparatus, comprising a carriage adapted to be propelled along the take-off runway, a mounting on said carriage for supporting an aeroplane with freedom to assume an attitude of flight, latching means securing the aeroplane on said mounting until after the lifting force developed on the aeroplane wings by the air stream due to the movement of the carriage exceeds the take-off weight of the aeroplane by a predetermined margin, but operable thereafter automatically to effect release of the aeroplane, and means acting on the latching means to delay such automatic release until said excess lift has been maintained continuously for substantially a predetermined period, a mounting at or near each corner of the carriage for a flanged wheel, flanged wheels on the respective mountings, a vertical pillar providing at its apex the mounting for the aeroplane, and a parallel linkage supporting the pillar from the booms whereby said pillar may be raised and lowered between the servicing position and the take-off position without disturbing the attitude of the aeroplane, the rearmost cross-member incorporating a housing for one or more jet-thrust motors.

5. Aeroplane-launching apparatus, comprising a carriage adapted to be propelled along the take-off runway, a mounting on said carriage for supporting an aeroplane with freedom to assume an attitude of flight, latching means securing the aeroplane on said mounting until after the lifting force developed on the aeroplane wings by the air stream due to the movement of the carriage exceeds the take-off weight of the aeroplane by a predetermined margin, but operable thereafter automatically to effect release of the aeroplane, and means acting on the latching means to delay such automatic release until said excess lift has been maintained continuously for substantially a predetermined period, a mounting at or near each corner of the carriage for a flanged wheel, flanged wheels on the respective mountings, a vertical pillar providing at its apex the mounting for the aeroplane, and a parallel linkage supporting the pillar from the booms whereby said pillar may be raised and lowered between the servicing position and the take-off position without disturbing the attitude of the aeroplane, braking means arranged when actuated to cooperate with track rails, and automatic mechanism for actuating said braking means when the aeroplane is released at take-off and/or after the carriage has travelled a predetermined distance.

BARNES NEVILLE WALLIS.

References Cited in the file of this patent

UNITED STATES PATENTS

| Number | Name | Date |
| --- | --- | --- |
| 1,851,129 | Reardan | Mar. 29, 1932 |
| 1,925,768 | Mayo | Sept. 5, 1933 |
| 2,135,033 | Courtney | Nov. 1, 1938 |
| 2,181,656 | Fleet | Nov. 28, 1939 |
| 2,331,837 | King | Oct. 12, 1943 |
| 2,485,601 | Hickman | Oct. 25, 1949 |
| 2,567,954 | Liebmann | Sept. 18, 1951 |

FOREIGN PATENTS

| Number | Country | Date |
| --- | --- | --- |
| 482,057 | Great Britain | Mar. 23, 1938 |
| 844,295 | France | Apr. 17, 1939 |
| 882,390 | France | Mar. 1, 1943 |